United States Patent
Liu et al.

(10) Patent No.: US 11,146,664 B2
(45) Date of Patent: Oct. 12, 2021

(54) METHOD FOR REMOTE VEHICLE DIAGNOSTICS AND DEVICE

(71) Applicant: LAUNCH TECH CO., LTD., Shenzhen (CN)

(72) Inventors: Jun Liu, Shenzhen (CN); Zhijian Chen, Shenzhen (CN)

(73) Assignee: LAUNCH TECH CO., LTD., Shenzhen (CN)

( * ) Notice: Subject to any disclaimer, the term of this patent is extended or adjusted under 35 U.S.C. 154(b) by 123 days.

(21) Appl. No.: 16/612,350

(22) PCT Filed: Aug. 28, 2019

(86) PCT No.: PCT/CN2019/103146
§ 371 (c)(1),
(2) Date: Nov. 8, 2019

(87) PCT Pub. No.: WO2021/035592
PCT Pub. Date: Mar. 4, 2021

(65) Prior Publication Data
US 2021/0218830 A1 Jul. 15, 2021

(51) Int. Cl.
*H04L 29/06* (2006.01)
*H04L 29/12* (2006.01)

(52) U.S. Cl.
CPC ........ *H04L 69/16* (2013.01); *H04L 61/2015* (2013.01)

(58) Field of Classification Search
None
See application file for complete search history.

(56) References Cited

U.S. PATENT DOCUMENTS

| 2002/0079238 A1* | 6/2002 | Wilson, Jr. | B65D 81/264 206/204 |
| 2006/0229777 A1* | 10/2006 | Hudson | G05B 23/021 701/31.4 |

(Continued)

FOREIGN PATENT DOCUMENTS

| CN | 104850113 A | 8/2015 |
| CN | 105745939 A | 7/2016 |

(Continued)

OTHER PUBLICATIONS

Johanson et al., "Remote Vehicle Diagnostics over the Internet using the DoIP protocol", The Sixth International Conference on Systems and Networks Communications, Oct. 23, 2011, pp. 226-231, ISBN:978-1-61208-166-3. (Year: 2011).*

(Continued)

*Primary Examiner* — Kenny S Lin
(74) *Attorney, Agent, or Firm* — Hauptman Ham, LLP

(57) ABSTRACT

A device connector receives a TCP data packet of a diagnostic device in a data TCP communication manner, encapsulates the TCP data packet into a first data packet, and transmits the first data packet to the vehicle connector through remote communication. A vehicle connector converts the first data packet into a TCP diagnostics instruction data packet and transmits the TCP diagnostics instruction data packet to a vehicle. The vehicle connector receives, based on TCP communication, a TCP diagnostics response data packet, encapsulates the TCP diagnostics response data packet into a second data packet, and transmits the second data packet to the device connector through the remote communication. The device connector converts the second data packet into the TCP diagnostics response data packet and transmits the TCP diagnostics response data packet to a (Continued)

diagnostic device. The diagnostic device obtains a diagnostics result and presents the diagnostics result to a user.

16 Claims, 6 Drawing Sheets

(56) References Cited

U.S. PATENT DOCUMENTS

| | | | |
|---|---|---|---|
| 2009/0216399 A1* | 8/2009 | Ishikawa | G07C 5/008 |
| | | | 701/31.4 |
| 2009/0276115 A1* | 11/2009 | Chen | G07C 5/008 |
| | | | 701/29.6 |
| 2013/0031318 A1* | 1/2013 | Chen | B60L 7/06 |
| | | | 711/154 |
| 2015/0268059 A1* | 9/2015 | Borghesani | H04W 4/024 |
| | | | 701/32.3 |
| 2018/0072250 A1* | 3/2018 | Kim | H04L 12/40006 |
| 2019/0026962 A1* | 1/2019 | Gintz | G07C 5/12 |
| 2019/0079842 A1* | 3/2019 | Chae | G06F 11/3013 |
| 2019/0132424 A1* | 5/2019 | Jeong | H04L 69/18 |
| 2020/0389436 A1* | 12/2020 | Go | H04L 61/103 |

FOREIGN PATENT DOCUMENTS

| | | |
|---|---|---|
| CN | 207096803 U | 3/2018 |
| JP | 2002331884 A | 11/2002 |

OTHER PUBLICATIONS

International Search Report issued in International Application No. PCT/CN2019/103146, dated May 20, 2020, pp. 1-4, National Intellectual Property Administiation, Beijing, China.

Supplementary European Search Report issued in corresponding EP Application No. EP 19797970, dated Mar. 30, 2021.

Johnson Mathias et al: "Remote Vehicle Diagnostics over the Internet using the DoIP Protocol", The Sixth International Conference on Systems and Networks Communications, [Online] Oct. 23, 2011 (Oct. 23, 2011), XP055788039, Retrieved from the Internet: URL: http://citeseerx.ist.psu.edu/viewdoc/download;jsessionid=0FCD6298AAB7C2778232ABB77C939E7B?doi=10.1.1.418.5332&rep=rep1&type=pdf> [retrieved on Mar. 22, 2021], p. 3-p. 6.

Anonymous: "GPRS core network—Wikipedia", Aug. 3, 2016 (Aug. 3, 2016), XP055788054, Retrieved from the Internet: URL: https://en.wikipedia.org/w/index.php?title=GPRS_core_network&oldid=732801019 [retrieved on Mar. 22, 2021], the whole document.

Luo Feng et al: "Implementation of bootloader based on DoIP", 2019 IEEE 2nd International Conference on Computer and Communication Engineering Technology (CCET), IEEE, Aug. 16, 2019 (Aug. 16, 2019), pp. 239-244, XP033707611, DOI: 10 1109/CCET48361.2019.8989318 [retrieved on Feb. 7, 2020], section II.

\* cited by examiner

METHOD FOR REMOTE VEHICLE DIAGNOSTICS AND DEVICE

RELATED APPLICATION

The present application is a National Phase of International Application Number PCT/CN2019/103146, filed Aug. 28, 2019.

TECHNICAL FIELD

This disclosure relates to the technical field of vehicle diagnostics, and more particularly to a method for remote vehicle diagnostics and a device.

BACKGROUND

With the sustained and rapid development of economy, the number of vehicles is growing at a relatively fast rate. Based on the demand for safety and comfort of the vehicles, it is urgent to timely and accurately determine the running state of the vehicle, so as to find faults in the vehicles as soon as possible and remove hidden dangers in time. Vehicle diagnostics refers to determining the performance of the vehicle and identifying locations and causes of faults without disassembling the vehicle (or disassembling only few components). The diagnostics includes, for example, detection and diagnosis of a vehicle engine, detection and diagnosis of a vehicle chassis, detection and diagnosis of a vehicle body and vehicle accessories, and detection of vehicle exhaust pollutant and vehicle noise, and the like.

Currently, vehicle diagnostics is performed based on ISO 13400 (Diagnostic communication over Internet Protocol (DoIP)), the DoIP vehicle diagnostics is, however, a local diagnostics based on a local area network, that is, the diagnostics on the vehicle can only be performed in the vicinity of the vehicle through a diagnostic device.

SUMMARY

According to embodiments of the present disclosure, a method for remote vehicle diagnostics and a device are provided, which can realize remote vehicle diagnostics by remotely simulating DoIP local diagnostics.

According to a first aspect of the present disclosure, a method for remote vehicle diagnostics is provided. The method is applicable to a remote diagnostic system. The remote diagnostic system includes a vehicle connector, a device connector, and a diagnostic device. The method includes the following. The device connector receives a transmission control protocol (TCP) data packet of the diagnostic device in a data TCP communication manner, encapsulates the TCP data packet into a first data packet, and transmits the first data packet to the vehicle connector through remote communication. The vehicle connector converts the first data packet received into a TCP diagnostics instruction data packet and transmits the TCP diagnostics instruction data packet to a vehicle. The vehicle connector receives, based on TCP communication, a TCP diagnostics response data packet returned by the vehicle according to the TCP diagnostics instruction data packet, encapsulates the TCP diagnostics response data packet into a second data packet, and transmits the second data packet to the device connector through the remote communication. The device connector converts the second data packet received into the TCP diagnostics response data packet and transmits the TCP diagnostics response data packet to the diagnostic device. The diagnostic device obtains a diagnostics result by analyzing and processing the TCP diagnostics response data packet and presents the diagnostics result to a user.

According to a second aspect of the present disclosure, a method for remote vehicle diagnostics is provided. The method is applicable to a device connector. The method includes the following. A TCP data packet of a diagnostic device is received in a TCP communication manner. The TCP data packet is encapsulated into a first data packet. The first data packet is transmitted to a vehicle connector through remote communication. At the vehicle connector, the first data packet received is converted into a TCP diagnostics instruction data packet and the TCP diagnostics instruction data packet is transmitted to a vehicle. At the vehicle connector, a TCP diagnostics response data packet returned by the vehicle according to the TCP diagnostics instruction data packet is received based on TCP communication and the TCP diagnostics response data packet is encapsulated into a second data packet. The second data packet transmitted by the vehicle connector is received through the remote communication. The second data packet is converted into the TCP diagnostics response data packet. The TCP diagnostics response data packet is transmitted to the diagnostic device. At the diagnostic device, a diagnostics result is obtained by analyzing and processing the TCP diagnostics response data packet and the diagnostics result is presented to a user.

In a first possible implementation form of the method for remote vehicle diagnostics according to the second aspect, before the TCP data packet of the diagnostic device is received in the TCP communication manner, the method further includes the following. A network connection with the diagnostic device is established to obtain an internet protocol (IP) address assigned to the device connector.

In a second possible implementation form of the method for remote vehicle diagnostics according to the first implementation form of the second aspect, before the TCP data packet of the diagnostic device is received in the TCP communication manner, the method further includes the following. A third data packet transmitted by the vehicle connector is received, where the third data packet is obtained by encapsulating a user datagram protocol (UDP) data packet broadcasted by the vehicle and received by the vehicle connector. The third data packet is converted into the UDP data packet of the vehicle. The UDP data packet of the vehicle is broadcasted. A TCP server identical to a TCP server of the vehicle is activated. At the diagnostic device, the UDP data packet of the vehicle is received and a TCP client is created to connect with the TCP server of the device connector. The vehicle connector is notified to create a TCP client to connect with the TCP server of the vehicle.

In a third possible implementation form of the method for remote vehicle diagnostics according to the first implementation form of the second aspect, the network connection with the diagnostic device is established to obtain the IP address assigned to the device connector as follows. A dynamic host configuration protocol (DHCP) client is activated. The diagnostic device is notified. The IP address assigned by the diagnostic device is received, or the IP address belonging to a same subnet as an IP address of the diagnostic device is obtained through Auto IP.

In a fourth possible implementation form of the method for remote vehicle diagnostics according to the second aspect or any of the implementations of the second aspect, the remote communication includes server data forwarding, peer-to-peer (P2P) communication, or mobile communication.

According to a third aspect of the present disclosure, a method for remote vehicle diagnostics is provided. The method is applicable to a vehicle connector. The method includes the following. A first data packet transmitted by a device connector is received through remote communication, where the first data packet is obtained by encapsulating a TCP data packet transmitted by a diagnostic device and received by the device connector in a TCP communication manner. The first data packet is converted into a TCP diagnostics instruction data packet. The TCP diagnostics instruction data packet is transmitted to a vehicle. A TCP diagnostics response data packet returned by the vehicle according to the TCP diagnostics instruction data packet is received based on TCP communication. The TCP diagnostics response data packet is encapsulated into a second data packet. The second data packet is transmitted to the device connector through the remote communication. At the device connector, the second data packet is converted into the TCP diagnostics response data packet and the TCP diagnostics response data packet is transmitted to the diagnostic device. At the diagnostic device, a diagnostics result is obtained by analyzing and processing the TCP diagnostics response data packet and the diagnostics result is presented to a user.

In a first possible implementation form of the method for remote vehicle diagnostics according to the third aspect, before the first data packet transmitted by the device connector is received through the remote communication, the method further includes the following. A network connection with the vehicle is established to assign an IP address to the vehicle.

In a second possible implementation form of the method for remote vehicle diagnostics according to the first implementation form of the third aspect, before the first data packet transmitted by the device connector is received through the remote communication, the method further includes the following. A UDP service is activated. A UDP data packet broadcasted by the vehicle is received. The UDP data packet broadcasted by the vehicle is encapsulated to a third data packet. The third data packet is transmitted to the diagnostic device through remote communication. At the device connector, the third data packet is converted into the UDP data packet of the vehicle, the UDP data packet of the vehicle is broadcasted, and a TCP server identical to a TCP server of the vehicle is activated. At the diagnostic device, the UDP data packet of the vehicle is received and a TCP client is created to connect with the TCP server of the device connector. A notification is received from the device connector and a TCP client is created to connect with the TCP server of the vehicle.

In a third possible implementation form of the method for remote vehicle diagnostics according to the first implementation form of the third aspect, the network connection with the vehicle is established to assign the IP address to the vehicle as follows. A DHCP server is activated to assign the IP address to the vehicle, or assigns the IP address belonging to a same subnet as an IP address of the vehicle through Auto IP.

In a fourth possible implementation form of the method for remote vehicle diagnostics according to the third aspect or any of the implementations of the third aspect, the remote communication includes server data forwarding, P2P communication, or mobile communication.

According to a fourth aspect of the present disclosure, a device connector is provided. The device connector includes a processor, a memory, a communication interface, and one or more programs stored in the memory and configured to be executed by the processor. The one or more programs include instructions which are configured to execute the operations of any of the method described in the second aspect of the present disclosure.

According to a fifth aspect of the present disclosure, a vehicle connector is provided. The vehicle connector includes a processor, a memory, a communication interface, and one or more programs stored in the memory and configured to be executed by the processor. The one or more programs include instructions which are configured to execute the operations of any of the method described in the third aspect of the present disclosure According to the method for remote vehicle diagnostics and the device of the present disclosure, the remote diagnostic system includes the vehicle connector, the device connector and the diagnostic device. The device connector receives the TCP data packet of the diagnostic device in a data TCP communication manner, encapsulates the TCP data packet into the first data packet, and transmits the first data packet to the vehicle connector through remote communication. The vehicle connector converts the first data packet received into the TCP diagnostics instruction data packet and transmits the TCP diagnostics instruction data packet to the vehicle. The vehicle connector receives, based on TCP communication, the TCP diagnostics response data packet returned by the vehicle according to the TCP diagnostics instruction data packet, encapsulates the TCP diagnostics response data packet into the second data packet, and transmits the second data packet to the device connector through the remote communication. The device connector converts the second data packet received into the TCP diagnostics response data packet and transmits the TCP diagnostics response data packet to the diagnostic device. The diagnostic device obtains the diagnostics result by analyzing and processing the TCP diagnostics response data packet and presents the diagnostics result to a user. According to the present disclosure, a connection between the vehicle and the vehicle connector is established, a remote communication connection between the vehicle connector and the device connector is established, and a connection between the device connector and the diagnostic device is established. Moreover, the vehicle connector can simulate a TCP service of the diagnostic device and the device connector can simulate a TCP service of the vehicle. As such, instructions of the diagnostic device during DoIP diagnostics can be transmitted to the vehicle remotely via the vehicle connector and the device connector, and responses of the vehicle during DoIP diagnostics can be transmitted to the diagnostic device remotely via the vehicle connector and the device connector. Therefore, the remote vehicle diagnostics can be realized by remotely simulating DoIP local diagnostics.

BRIEF DESCRIPTION OF THE DRAWINGS

In order to describe technical solutions of embodiments of the present disclosure or the related art more clearly, the following will give a brief description of accompanying drawings used for describing the embodiments of the present disclosure.

DETAILED DESCRIPTION

According to embodiments of the present disclosure, a method for remote vehicle diagnostics and a device are provided, which can realize remote vehicle diagnostics by remotely simulating DoIP local diagnostics.

In order for those skilled in the art to better understand technical solutions of the present disclosure, technical solutions of embodiments of the present disclosure will be described clearly and completely with reference to accompanying drawings in the embodiments of the present disclosure.

The terms "first", "second", "third", "fourth" and the like in the specification, the claims, and the accompany drawings of the present disclosure are used to distinguish different objects rather than describe a particular order. In addition, the terms "include", "comprise", and "have" as well as variations thereof are intended to cover a non-exclusive inclusion.

Hereinafter, embodiments of the present disclosure will be described in detail.

Figure 1:
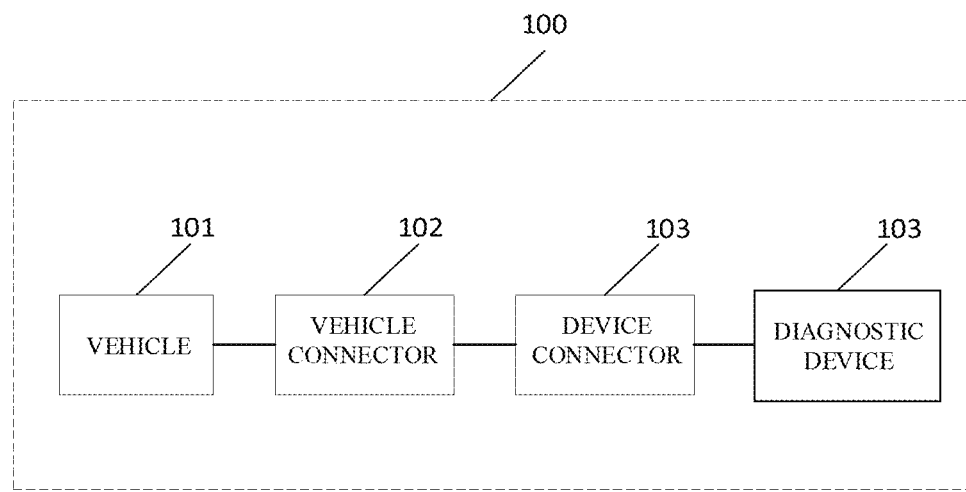
FIG. 1 is a schematic diagram illustrating a remote diagnostic system according to embodiments of the present disclosure.

FIG. 1 is a schematic diagram illustrating a remote diagnostic system 100 according to embodiments of the present disclosure. As illustrated in FIG. 1, the remote diagnostic system 100 includes a vehicle 101, a vehicle connector 102, a device connector 103, and a diagnostic device 104. The device connector 103 receives a transmission control protocol (TCP) data packet of the diagnostic device 104 in a data TCP communication manner, encapsulates the TCP data packet into a first data packet, and transmits the first data packet to the vehicle connector 102 through remote communication (in other words, remote communication connection). The vehicle connector 102 converts the first data packet received into a TCP diagnostics instruction data packet and transmits the TCP diagnostics instruction data packet to the vehicle 101. The vehicle connector 102 receives, based on TCP communication, a TCP diagnostics response data packet returned by the vehicle 101 according to the TCP diagnostics instruction data packet, encapsulates the TCP diagnostics response data packet into a second data packet, and transmits the second data packet to the device connector 103 through the remote communication. The device connector 103 converts the second data packet received into the TCP diagnostics response data packet and transmits the TCP diagnostics response data packet to the diagnostic device 104. The diagnostic device 104 obtains a diagnostics result by analyzing and processing the TCP diagnostics response data packet and presents the diagnostics result to a user.

In embodiments of the present disclosure, the vehicle connector 102 is, for example, a telematics BOX (T-BOX), a modular vehicle communication interface (MVCI), a connector, and the like. The device connector 103 may be an electronic device having a communication function. The diagnostic device 104 may be a variety of vehicle scanning tools, such as a hand-held vehicle scanning tool, a PC-type vehicle scanning tool, and the like.

According to embodiments of the present disclosure, forwarding of a TCP data packet can be implemented between the vehicle 101 and the diagnostic device 104 via the vehicle connector 102 and the device connector 103, thereby realizing TCP diagnostics communication. In some embodiments, prior to performing TCP diagnostics communication, a user datagram protocol (UDP) connection between the vehicle connector 102 and the vehicle 101 is established. The vehicle connector 102 receives a UDP data packet of the vehicle 101, where the UDP data packet of the vehicle 101 carries an IP address of the vehicle 101, and the vehicle connector 102 transmits the UDP data packet of the vehicle 101 to the device connector 103 through remote communication. The device connector 103 transmits the UDP data packet of the vehicle 101 to the diagnostic device 104. The diagnostic device 104 receives the UDP data packet carrying the IP address of the vehicle 101, obtains the IP address of the vehicle 101, and establishes a TCP connection with the device connector 103 according to the IP address of the vehicle 101. Then, the device connector 103 receives the TCP data packet of the diagnostic device 104 in a data TCP communication manner.

In some embodiments, the remote communication between the vehicle connector 102 and the device connector 103 is performed in a server data forwarding manner, that is, the vehicle connector 102 and the device connector 103 are coupled with a server. Specifically, the vehicle connector 102 transmits data to the server and then the server transmits the data of the vehicle connector 102 to the device connector 103, or the device connector 103 transmits data to the server and then the server transmits the data of the device connector 103 to the vehicle connector 102. In some embodiments, the remote communication is a peer-to-peer (P2P) communication, that is, data interchange between the vehicle connector 102 and the device connector 103 is performed without a server, in other words, the vehicle connector and the device connector communicate with each other through a P2P network for data interchange. In some embodiments, the remote communication is a mobile communication, and the mobile communication may be 2G/3G/4G/5G mobile communication.

In some embodiments, the vehicle connector 102 can be configured with fixed DoIP communication pins. In some embodiments, the vehicle connector 102 can detect configuration of DoIP communication pins of the vehicle 101 automatically, and communication pins of the vehicle connector 102 can be configured according to the configuration of the communication pins of the vehicle 101.

In some embodiments, the device connector 103 can be configured with fixed DoIP communication pins. In some embodiments, the device connector 103 can obtain configuration of DoIP communication pins of the vehicle 101 detected by the vehicle connector 102, and communication pins of the device connector 103 can be configured according to the configuration of the communication pins of the vehicle 101.

According to embodiments of the present disclosure, the remote diagnostic system includes the vehicle connector, the device connector, and the diagnostic device. The device connector receives the TCP data packet of the diagnostic device in a data TCP communication manner, encapsulates the TCP data packet into the first data packet, and transmits the first data packet to the vehicle connector through remote communication. The vehicle connector converts the first data packet received into the TCP diagnostics instruction data packet and transmits the TCP diagnostics instruction data packet to the vehicle. The vehicle connector receives, based on TCP communication, the TCP diagnostics response data packet returned by the vehicle according to the TCP diagnostics instruction data packet, encapsulates the TCP diagnostics response data packet into the second data packet, and transmits the second data packet to the device connector through the remote communication. The device connector converts the second data packet received into the TCP diagnostics response data packet and transmits the TCP diagnostics response data packet to the diagnostic device. The diagnostic device obtains the diagnostics result by analyzing and processing the TCP diagnostics response data packet and presents the diagnostics result to a user. According to the present disclosure, a connection between the vehicle and the vehicle connector is established, a remote communication connection between the vehicle connector and the device connector is established, and a connection between the device connector and the diagnostic device is established. Moreover, the vehicle connector can simulate a TCP service of the diagnostic device and the device connector can simulate a TCP service of the vehicle. As such, instructions of the diagnostic device during DoIP diagnostics can be transmitted to the vehicle remotely via the vehicle connector and the device connector, and responses of the vehicle during DoIP diagnostics can be transmitted to the diagnostic device remotely via the vehicle connector and the device connector. Therefore, the remote vehicle diagnostics can be realized by remotely simulating DoIP local diagnostics.

Figure 2:
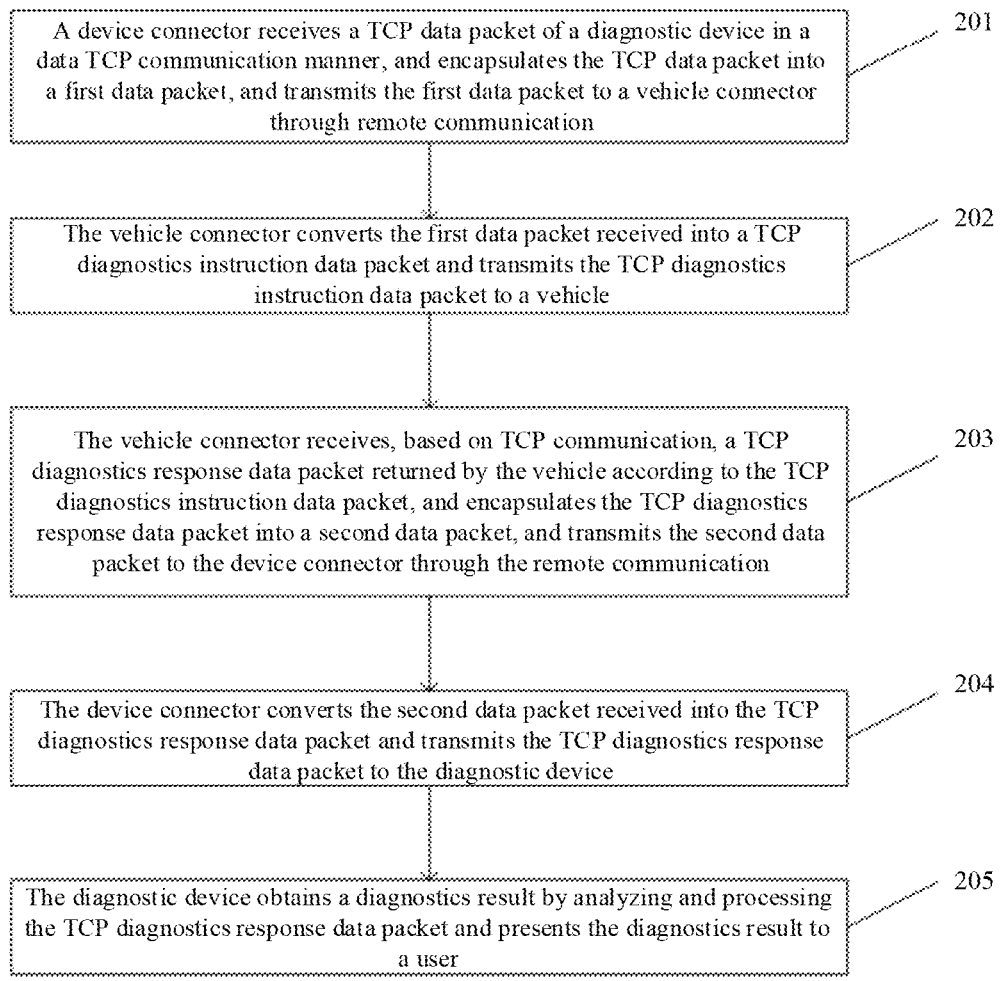
FIG. 2 is a schematic flowchart illustrating a method for remote vehicle diagnostics according to embodiments of the present disclosure.

FIG. 2 is a schematic flowchart illustrating a method for remote vehicle diagnostics according to embodiments of the present disclosure. The method is applicable to a remote diagnostic system including a vehicle connector, a device connector, and a diagnostic device, which can realize remote vehicle diagnostics by remotely simulating DoIP local diagnostics. As illustrated in the FIG. 2, a method for remote vehicle diagnostics described in conjunction with an embodiment of the present disclosure may include the following.

At 201, the device connector receives a TCP data packet of the diagnostic device in a data TCP communication manner (i.e., through a TCP communication connection), encapsulates the TCP data packet into a first data packet, and transmits the first data packet to the vehicle connector through remote communication (i.e., through a remote communication connection).

In some embodiments, before the device connector receives the TCP data packet of the diagnostic device, the method further includes the following. A local network connection between the vehicle connector and the vehicle is established and a local network connection between the device connector and the diagnostic device is established. A remote communication connection between the vehicle connector and the device connector is established. A UDP connection between the vehicle connector and the vehicle is established. The vehicle connector receives a UDP data packet of the vehicle and transmits the UDP data packet of the vehicle to the device connector through remote communication. The device connector transmits the UDP data packet of the vehicle to the diagnostic device; or the device connector transmits the UDP data packet of the vehicle to the diagnostic device after modifying an MAC address of the vehicle carried in a UDP data area of the UDP data packet of the vehicle to an MAC address of the device connector. A UDP connection between the device connector and the diagnostic device is established. The device connector receives a UDP data packet of the diagnostic device and transmits the UDP data packet of the diagnostic device to the vehicle connector through the remote communication. The vehicle connector transmits the UDP data packet of the diagnostic device to the vehicle. A TCP connection between the device connector and the diagnostic device is established and a TCP connection between the vehicle connector and the vehicle is established.

In some embodiments, the local network connection between the vehicle connector and the vehicle is established as follows. When remote vehicle diagnostics is required, an IP address is assigned to the vehicle and the local network connection between the vehicle and the vehicle connector is established. The vehicle connector is, for example, a T-BOX, an MVCI, a connector, and the like.

In some embodiments, the IP address is assigned to the vehicle as follows. The vehicle activates a dynamic host configuration protocol (DHCP) service (i.e., a DHCP client). The vehicle connector activates a DHCP service (i.e., a DHCP server). The vehicle connector assigns the IP address to the vehicle. The DHCP is a network protocol of a local area network, which works under UDP protocol and is mainly used for two purposes. On the one hand, the DHCP is used for intranet or network service providers to automatically assign IP addresses; on the other hand, the DHCP is used as a means of performing by users as intranet administrators central management on all computers. The DHCP protocol adopts a client/server model, and a task of dynamic assignment of a host address is driven by a network host. When a DHCP server receives information from a network host for applying for an address, the DHCP server sends corresponding address configuration information and other information to the network host to implement dynamic configuration of address information of the network host.

In some embodiments, the IP address is assigned to the vehicle as follows. The vehicle connector assigns the IP address belonging to a same subnet as an IP address of the vehicle through Auto IP.

In some embodiments, the local network connection between the device connector and the diagnostic device is established as follows. When remote vehicle diagnostics is required, an IP address is assigned to the device connector and the local network connection between the diagnostic device and the device connector is established. The device connector may be an electronic device having a communication function. The diagnostic device may be a variety of vehicle scanning tools, such as a hand-held vehicle scanning tool, a PC-type vehicle scanning tool, and the like.

In some embodiments, the IP address is assigned to the device connector as follows. The device connector activates a DHCP service (i.e., a DHCP client). The diagnostic device activates a DHCP service (i.e., a DHCP server). The diagnostic device assigns the IP address to the device connector.

In some embodiments, the IP address is assigned to the device connector as follows. The device connector is assigned with (or obtains) the IP address belonging to a same subnet as an IP address of the diagnostic device through Auto IP.

In some embodiments, the remote communication between the vehicle connector and the device connector is performed in a server data forwarding manner, that is, the vehicle connector and the device connector are coupled with a server. Specifically, the vehicle connector transmits data to the server and then the server transmits the data of the vehicle connector to the device connector, or the device connector transmits data to the server and then the server transmits the data of the device connector to the vehicle connector. In some embodiments, the remote communication is a P2P communication, that is, data interchange between the vehicle connector and the device connector is performed without a server, in other words, the vehicle connector and the device connector communicate with each other through a P2P network for data interchange. In some embodiments, the remote communication is a mobile communication, and the mobile communication may be 2G/3G/4G/5G mobile communication.

In some embodiments, a UDP connection between the vehicle connector and the vehicle is established. The vehicle connector receives a UDP data packet of the vehicle, and transmits the UDP data packet of the vehicle to the device connector through remote communication. The device connector transmits the UDP data packet of the vehicle to the diagnostic device, or the device connector transmits the UDP data packet of the vehicle to the diagnostic device after modifying an MAC address of the vehicle carried in a UDP data area of the UDP data packet of the vehicle to an MAC address of the device connector. As an example, a UDP connection between the vehicle connector and the vehicle is established. The vehicle activates a UDP service and broadcasts a UDP data packet of the vehicle (where the UDP data packet of the vehicle carries an IP address of the vehicle). The vehicle connector activates a UDP service to receive the UDP data packet of the vehicle broadcasted by the vehicle. The vehicle connector encapsulates the UDP data packet of the vehicle into a data packet suitable for remote communication (i.e., remote transmission), and transmits the encapsulated data packet to the device connector through remote communication (where a header of the UDP data packet changes during a transmission process while transported data of the UDP data packet remains unchanged). The device connector receives the data packet transmitted by the vehicle connector, obtains the UDP data packet of the vehicle by decapsulating the data packet transmitted by the vehicle connector, and then activates a UDP service and broadcasts the UDP data packet of the vehicle, or the device connector obtains the UDP data packet of the vehicle by decapsulating the data packet received, and then broadcasts the UDP data packet of the vehicle after modifying an MAC address of the vehicle carried in a UDP data area of the UDP data packet of the vehicle to an MAC address of the device connector (whether the MAC address of the vehicle carried in the UDP data area needs to be modified is determined according to different vehicles). The diagnostic device activates a UDP service to receive the UDP data packet of the vehicle broadcasted by the device connector (where the UDP data packet received by the diagnostic device carries the IP address of the vehicle).

According to the above embodiments, the vehicle can activate a UDP service and broadcast a UDP data packet of the vehicle. At the vehicle connector, a UDP service can be activated to receive the UDP data packet of the vehicle. The UDP is a connectionless transport layer protocol in an open system interconnection (OSI) reference model. The UDP provides a transaction-oriented simple unreliable information delivery service and is mainly applicable to transmissions that do not require packets to arrive in order.

In some embodiments, a UDP connection between the device connector and the diagnostic device is established. The device connector receives a UDP data packet of the diagnostic device, and transmits the UDP data packet of the diagnostic device to the vehicle connector through remote communication. The vehicle connector transmits the UDP data packet of the diagnostic device to the vehicle. As an example, a UDP connection between the device connector and the diagnostic device is established. The diagnostic device activates a UDP service and broadcasts a UDP data packet of the diagnostic device. The device connector activates a UDP service and receives the UDP data packet of the diagnostic device broadcasted by the diagnostic device. The device connector transmits the UDP data packet of the diagnostic device to the vehicle connector through remote communication (where a header of the UDP data packet changes during a transmission process while transported data of the UDP data packet remains unchanged). The vehicle connector receives the UDP data packet of the diagnostic device transmitted by the device connector, activates a UDP service, and broadcasts the UDP data packet of the diagnostic device. The vehicle activates a UDP service and receives the UDP data packet of the diagnostic device broadcasted by the vehicle connector.

According to the above embodiments, the diagnostic device can activate a UDP service and broadcast the UDP data packet of the diagnostic device. At the device connector, a UDP service can be activated to receive the UDP data packet of the diagnostic device. The UDP is a connectionless transport layer protocol in an OSI reference model. The UDP provides a transaction-oriented simple unreliable information delivery service and is mainly applicable to transmissions that do not require packets to arrive in order.

In some embodiments, the TCP connection between the device connector and the diagnostic device is established and the TCP connection between the vehicle connector and the vehicle is established as follows. The device connector activates a TCP service (i.e., a TCP server), where the TCP service of the device connector is the same as a TCP service (i.e., a TCP server) of the vehicle, and the device connector can simulate the TCP service of the vehicle. The TCP is a connection-oriented, reliable, and byte stream-based transport layer communication protocol. A connection is established based on a three-way handshake protocol. Specifically, an active entity sends a synchronous (SYN) connection request, waits for other entity to answer SYN+ acknowledgment (ACK), and finally sends an ACK in response to the SYN of other entity. The diagnostic device receives a UDP data packet of the vehicle broadcasted by the device connector, where the UDP data packet received by the diagnostic device carries an IP address of the vehicle. The diagnostic device obtains the IP address of the vehicle and activates a TCP service (i.e., a TCP client). Since the TCP server of the device connector is identical to the TCP server of the vehicle, the device connector can simulate the TCP service of the vehicle. The diagnostic device can create a TCP client to connect with the TCP server of the device connector according to the IP address of the vehicle. After the TCP connection between the diagnostic device and the device connector is established, the device connector notifies the vehicle connector to establish a TCP connection with the vehicle. As an example, the TCP connection between the vehicle connector and the vehicle is established as follows. The vehicle connector activates a TCP service (i.e., a TCP client), where the vehicle connector can simulate a TCP service of the diagnostic device. The vehicle activates a TCP service (i.e., a TCP server). The vehicle connector creates a TCP client to connect with the TCP server of the vehicle.

In some embodiments, the first data packet is a data packet suitable for remote communication, the device connector receives the TCP data packet of the diagnostic device in a data TCP communication manner, encapsulates the TCP data packet into the first data packet, and transmits the first data packet to the vehicle connector through remote communication as follows. TCP communication is performed between the diagnostic device and the device connector, and a DoIP connection (i.e., meeting an ISO 13400 standard) is established between the diagnostic device and the device connector. The device connector receives and encapsulates the TCP data packet of the diagnostic device, and then transmits the TCP data packet to the vehicle connector through remote communication. During this process, transported data of the TCP data packet remains unchanged.

At 202, the vehicle connector converts the first data packet received into a TCP diagnostics instruction data packet and transmits the TCP diagnostics instruction data packet to a vehicle.

Specifically, the vehicle connector receives the first data packet and obtains the TCP diagnostics instruction data packet by decapsulating and converting the first data packet. Then, the vehicle connector transmits the TCP diagnostics instruction data packet to the vehicle.

At 203, the vehicle connector receives, based on TCP communication (i.e., through a TCP communication connection), a TCP diagnostics response data packet returned by the vehicle according to the TCP diagnostics instruction data packet, encapsulates the TCP diagnostics response data packet into a second data packet, and transmits the second data packet to the device connector through the remote communication (i.e., through the remote communication connection).

As an example, the vehicle receives the TCP diagnostics instruction data packet transmitted by the vehicle connector and obtains the TCP diagnostics response data packet according to the TCP diagnostics instruction data packet. The vehicle transmits the TCP diagnostics response data packet to the vehicle connector. The vehicle connector receives the TCP diagnostics response data packet transmitted by the vehicle and encapsulates the TCP diagnostics response data packet into the second data packet, where the second data packet is a data packet suitable for remote communication. TCP communication is performed between the vehicle and the vehicle connector, and a DoIP connection (i.e., meeting an ISO 13400 standard) is established between the vehicle and the vehicle connector. The vehicle connector receives and encapsulates the TCP diagnostics response data packet returned by the vehicle, and then transmits the TCP diagnostics response data packet to the device connector through remote communication. During this process, transported data of the TCP data packet remains unchanged.

At 204, the device connector converts the second data packet received into the TCP diagnostics response data packet and transmits the TCP diagnostics response data packet to the diagnostic device.

Specifically, the device connector receives the second data packet transmitted by the vehicle connector and obtains the TCP diagnostics response data packet by decapsulating and converting the second data packet. Then, the device connector transmits the TCP diagnostics response data packet to the diagnostic device.

By repeatedly performing operations at 201 to 204, remote TCP data interchange can be realized between the vehicle and the diagnostic device, thereby realizing remote vehicle diagnostics.

At 205, the diagnostic device obtains a diagnostics result by analyzing and processing the TCP diagnostics response data packet and presents the diagnostics result to a user.

According to embodiments of the present disclosure, the remote diagnostic system includes the vehicle connector, the device connector, and the diagnostic device. The device connector receives the TCP data packet of the diagnostic device in a data TCP communication manner, encapsulates the TCP data packet into the first data packet, and transmits the first data packet to the vehicle connector through remote communication. The vehicle connector converts the first data packet received into the TCP diagnostics instruction data packet and transmits the TCP diagnostics instruction data packet to the vehicle. The vehicle connector receives, based on TCP communication, the TCP diagnostics response data packet returned by the vehicle according to the TCP diagnostics instruction data packet, encapsulates the TCP diagnostics response data packet into the second data packet, and transmits the second data packet to the device connector through the remote communication. The device connector converts the second data packet received into the TCP diagnostics response data packet and transmits the TCP diagnostics response data packet to the diagnostic device. The diagnostic device obtains the diagnostics result by analyzing and processing the TCP diagnostics response data packet and presents the diagnostics result to a user. According to the present disclosure, a connection between the vehicle and the vehicle connector is established, a remote communication connection between the vehicle connector and the device connector is established, and a connection between the device connector and the diagnostic device is established. Moreover, the vehicle connector can simulate a TCP service of the diagnostic device and the device connector can simulate a TCP service of the vehicle. As such, instructions of the diagnostic device during DoIP diagnostics can be transmitted to the vehicle remotely via the vehicle connector and the device connector, and responses of the vehicle during DoIP diagnostics can be transmitted to the diagnostic device remotely via the vehicle connector and the device connector. Therefore, the remote vehicle diagnostics can be realized by remotely simulating DoIP local diagnostics.

Figure 3:
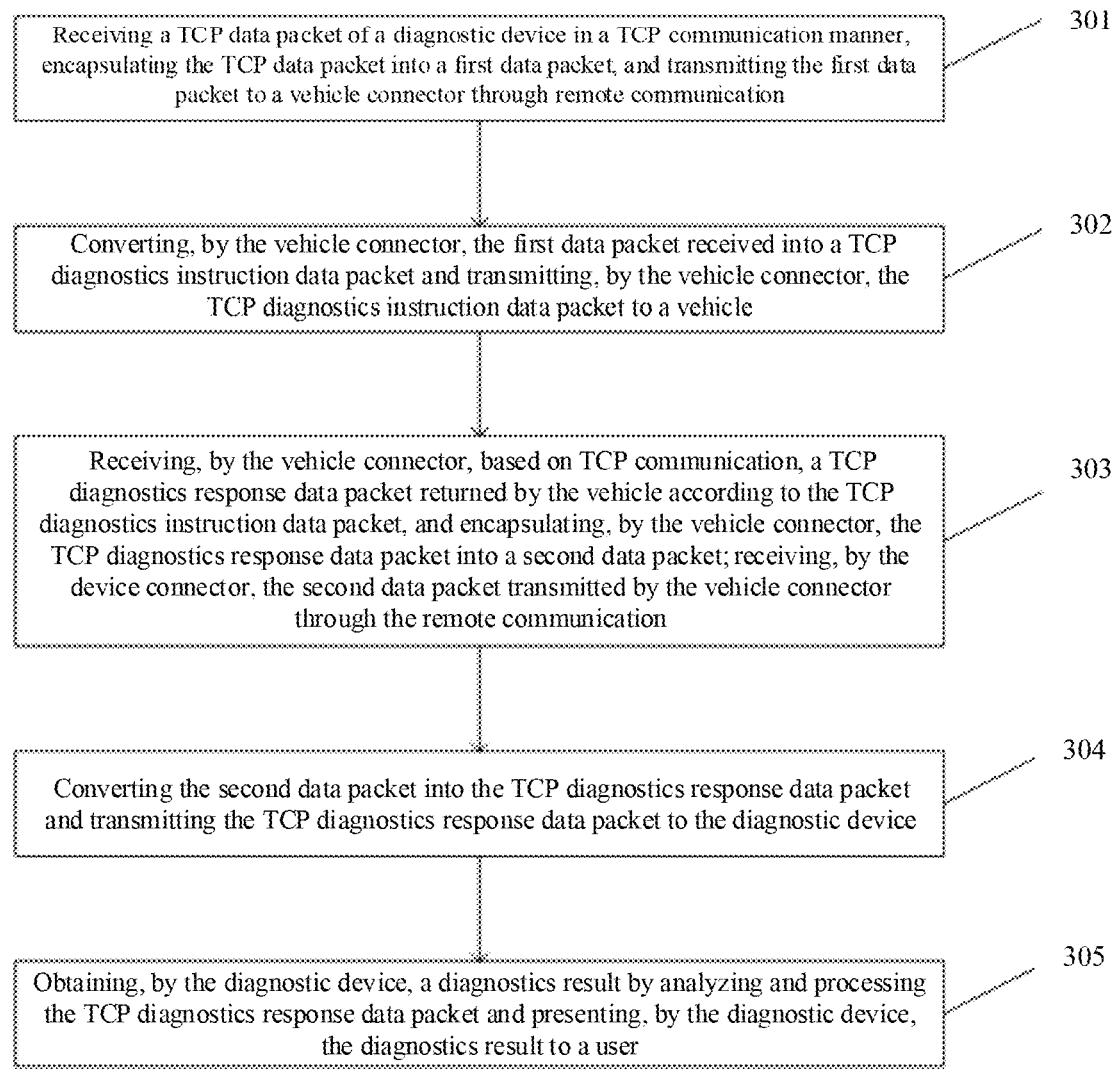
FIG. 3 is a schematic flowchart illustrating a method for remote vehicle diagnostics according to other embodiments of the present disclosure.

FIG. 3 is a schematic flowchart illustrating a method for remote vehicle diagnostics according to other embodiments of the present disclosure. The method is applicable to a device connector. The device connector may be an electronic device having a communication function. As illustrated in FIG. 3, a method for remote vehicle diagnostics described in conjunction with another embodiment of the present disclosure may include the following.

At 301, a TCP data packet of a diagnostic device is received in a TCP communication manner (i.e., through a TCP communication connection), the TCP data packet is encapsulated into a first data packet, and the first data packet is transmitted to a vehicle connector through remote communication (i.e., through a remote communication connection).

In some embodiments, before the TCP data packet of the diagnostic device is received in the TCP communication manner, the method further includes the following. The device connector establishes a network connection with the diagnostic device to obtain an IP address assigned to the device connector.

In some embodiments, the device connector establishes the network connection with the diagnostic device to obtain the IP address assigned to the device connector as follows. The device connector activates a DHCP service (i.e., a DHCP client) and notifies the diagnostic device. The device connector receives (or obtains) the IP address assigned by the diagnostic device; alternatively, the device connector is assigned with (or obtains) the IP address belonging to a same subnet as an IP address of the diagnostic device through Auto IP.

In some embodiments, before the TCP data packet of the diagnostic device is received in the TCP communication manner, the method further includes the following. The device connector receives a third data packet transmitted by the vehicle connector, where the third data packet is obtained by encapsulating a UDP data packet broadcasted by the vehicle and received by the vehicle connector. The device connector converts the third data packet into the UDP data packet of the vehicle and broadcasts the UDP data packet of the vehicle. The device connector activates a TCP server identical to a TCP server of the vehicle. At the diagnostic device, the UDP data packet of the vehicle is received and a TCP client is created to connect with the TCP server of the device connector. The device connector notifies the vehicle connector to create a TCP client to connect with the TCP server of the vehicle.

Specifically, the vehicle connector receives a UDP data packet broadcasted by the vehicle, and encapsulates the UDP data packet of the vehicle to obtain the third data packet, where the third data packet is a data packet suitable for remote communication. The vehicle connector transmits the third data packet to the device connector through remote communication. The device connector receives the third data packet, obtains the UDP data packet of the vehicle by decapsulating and converting the third data packet, and broadcasts the UDP data packet of the vehicle, or the device connector obtains the UDP data packet of the vehicle by decapsulating and converting the third data packet, and broadcasts the UDP data packet of the vehicle after modifying an MAC address of the vehicle carried in a UDP data area of the UDP data packet of the vehicle to an MAC address of the device connector. The device connector activates a TCP service (i.e., a TCP server), where the TCP server of the device connector is the same as a TCP service (i.e., a TCP server) of the vehicle. The diagnostic device receives the UDP data packet of the vehicle, where the UDP data packet received by the diagnostic device carries an IP address of the vehicle. The diagnostic device obtains the IP address of the vehicle and activates a TCP service (i.e., a TCP client). Since the TCP server of the device connector is identical to the TCP server of the vehicle, the diagnostic device can create a TCP client to connect with the TCP server of the device connector according to the IP address of the vehicle.

In some embodiments, the remote communication includes server data forwarding, P2P communication, or mobile communication. The mobile communication may be 2G/3G/4G/5G mobile communication.

At 302, the vehicle connector converts the first data packet received into a TCP diagnostics instruction data packet and transmits the TCP diagnostics instruction data packet to a vehicle.

Specifically, the vehicle connector receives the first data packet, and obtains the TCP diagnostics instruction data packet by decapsulating and converting the first data packet. Then, the vehicle connector transmits the TCP diagnostics instruction data packet to the vehicle.

At 303, the vehicle connector receives, based on TCP communication (i.e., through a TCP communication connection), a TCP diagnostics response data packet returned by the vehicle according to the TCP diagnostics instruction data packet, and encapsulates the TCP diagnostics response data packet into a second data packet; the device connector receives the second data packet transmitted by the vehicle connector through the remote communication (i.e., the vehicle connector transmits the second data packet to the device connector through the remote communication connection).

Specifically, the vehicle receives the TCP diagnostics instruction data packet transmitted by the vehicle connector and obtains the TCP diagnostics response data packet according to the TCP diagnostics instruction data packet. The vehicle transmits the TCP diagnostics response data packet to the vehicle connector. The vehicle connector receives the TCP diagnostics response data packet transmitted by the vehicle and encapsulates the TCP diagnostics response data packet into the second data packet, where the second data packet is a data packet suitable for remote communication.

At 304, the second data packet received is converted into the TCP diagnostics response data packet and transmits the TCP diagnostics response data packet to the diagnostic device.

Specifically, the device connector receives the second data packet, and obtains the TCP diagnostics response data packet by decapsulating and converting the second data packet. Then, the device connector transmits the TCP diagnostics response data packet to the diagnostic device.

By repeatedly performing operations at 301 to 304, remote TCP data interchange can be realized between the vehicle and the diagnostic device, thereby realizing remote vehicle diagnostics.

At 305, the diagnostic device obtains a diagnostics result by analyzing and processing the TCP diagnostics response data packet and presents the diagnostics result to a user.

Figure 4:
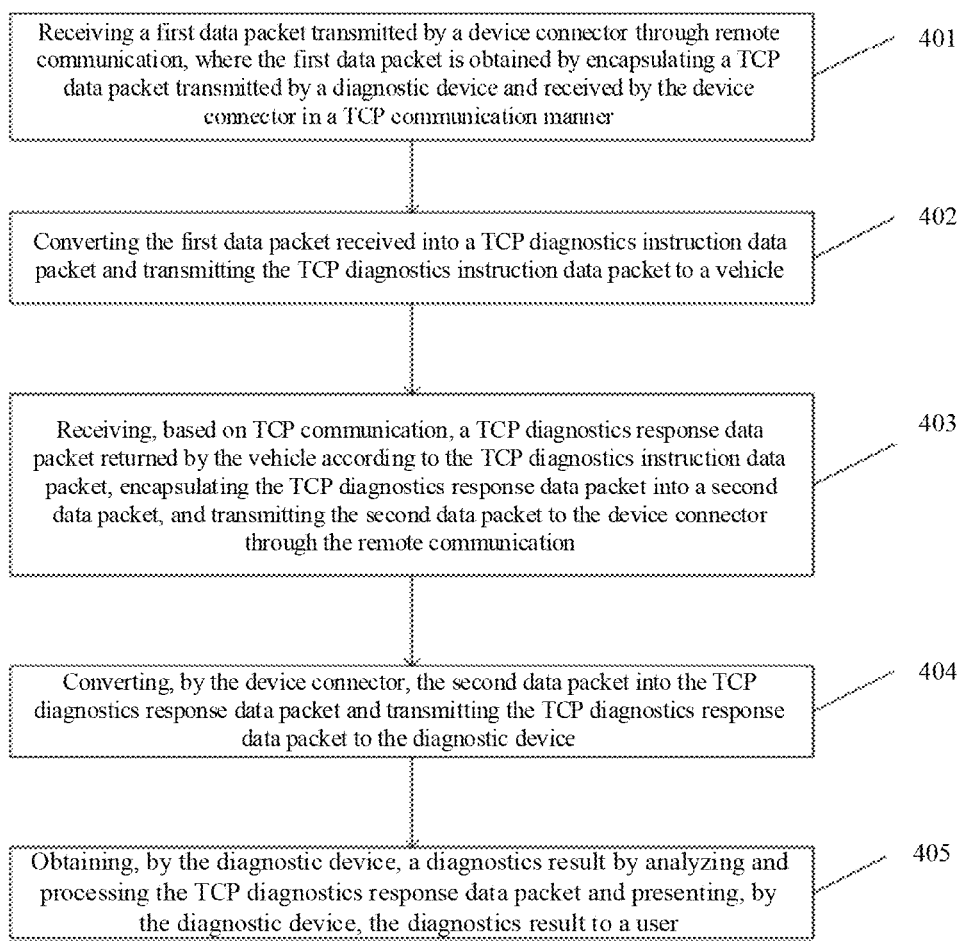
FIG. 4 is a schematic flowchart illustrating a method for remote vehicle diagnostics according to other embodiments of the present disclosure.

FIG. 4 is a schematic flowchart illustrating a method for remote vehicle diagnostics according to other embodiments of the present disclosure. The method is applicable to a vehicle connector. The vehicle connector is, for example, a T-BOX, an MVCI, a connector, and the like. As illustrated in FIG. 4, a method for remote vehicle diagnostics described in conjunction with another embodiment of the present disclosure may include the following.

At 401, a first data packet transmitted by a device connector is received through remote communication (i.e., through a remote communication connection), where the first data packet is obtained by encapsulating a TCP data packet transmitted by a diagnostic device and received by the device connector in a TCP communication manner (i.e., through a TCP communication connection).

In some embodiments, before the first data packet transmitted by the device connector is received through the remote communication, the method further includes the following. The vehicle connector establishes a network connection with the vehicle to assign an IP address to the vehicle.

In some embodiments, the vehicle connector establishes the network connection with the vehicle to assign the IP address to the vehicle as follows. The vehicle connector activates a DHCP service (i.e., a DHCP server) to assign the IP address to the vehicle, or assigns the IP address belonging to a same subnet as an IP address of the vehicle through Auto IP.

In some embodiments, before the first data packet transmitted by the device connector is received through the remote communication, the method further includes the following. The vehicle connector activates a UDP service. The vehicle connector receives a UDP data packet broadcasted by the vehicle, encapsulates the UDP data packet broadcasted by the vehicle to a third data packet, and transmits the third data packet to the device connector through remote communication. The device connector converts the third data packet into the UDP data packet of the vehicle, broadcasts the UDP data packet of the vehicle, and activates a TCP server identical to a TCP server of the vehicle. The diagnostic device receives the UDP data packet of the vehicle and creates a TCP client to connect with the TCP server of the device connector. The vehicle connector receives a notification of the device connector and creates a TCP client to connect with the TCP server of the vehicle.

Specifically, the vehicle connector receives a UDP data packet broadcasted by the vehicle, and encapsulates the UDP data packet of the vehicle to obtain the third data packet (where the third data packet is a data packet suitable for remote communication). The vehicle connector transmits the third data packet to the device connector through remote communication. The device connector receives the third data packet, obtains the UDP data packet of the vehicle by decapsulating and converting the third data packet, and broadcasts the UDP data packet of the vehicle, or the device connector obtains the UDP data packet of the vehicle by decapsulating and converting the third data packet, and broadcasts the UDP data packet of the vehicle after modifying an MAC address of the vehicle carried in a UDP data area of the UDP data packet of the vehicle to an MAC address of the device connector. The device connector activates a TCP service (i.e., a TCP server), where the TCP service of the device connector is the same as a TCP service (i.e., a TCP server) of the vehicle. The diagnostic device receives the UDP data packet of the vehicle (where the UDP data packet received by the diagnostic device carries an IP address of the vehicle). The diagnostic device obtains the IP address of the vehicle and activates a TCP service (i.e., a TCP client). Since the TCP server of the device connector is identical to the TCP server of the vehicle, the diagnostic device can create a TCP client to connect with the TCP server of the device connector according to the IP address of the vehicle.

In some embodiments, the remote communication includes server data forwarding, P2P communication, or mobile communication.

At 402, the first data packet is converted into a TCP diagnostics instruction data packet and transmits the TCP diagnostics instruction data packet to a vehicle.

Specifically, the vehicle connector receives the first data packet, and obtains the TCP diagnostics instruction data packet by decapsulating and converting the first data packet. Then, the vehicle connector transmits the TCP diagnostics instruction data packet to the vehicle.

At 403, a TCP diagnostics response data packet returned by the vehicle according to the TCP diagnostics instruction data packet is received based on TCP communication (i.e., through a TCP communication connection), the TCP diagnostics response data packet is encapsulated into a second data packet, and the second data packet is transmitted to the device connector through the remote communication (i.e., through the remote communication connection).

Specifically, the vehicle receives the TCP diagnostics instruction data packet transmitted by the vehicle connector and obtains the TCP diagnostics response data packet according to the TCP diagnostics instruction data packet. The vehicle transmits the TCP diagnostics response data packet to the vehicle connector. The vehicle connector receives the TCP diagnostics response data packet transmitted by the vehicle and encapsulates the TCP diagnostics response data packet into the second data packet (where the second data packet is a data packet suitable for remote communication).

At 404, the device connector converts the second data packet into the TCP diagnostics response data packet and transmits the TCP diagnostics response data packet to the diagnostic device.

Specifically, the device connector receives the second data packet, and obtains the TCP diagnostics response data packet by decapsulating and converting the second data packet. Then, the device connector transmits the TCP diagnostics response data packet to the diagnostic device.

By repeatedly performing operations at 401 to 404, remote TCP data interchange can be realized between the vehicle and the diagnostic device, thereby realizing remote vehicle diagnostics.

At 405, the diagnostic device obtains a diagnostics result by analyzing and processing the TCP diagnostics response data packet and presents the diagnostics result to a user.

Figure 5:
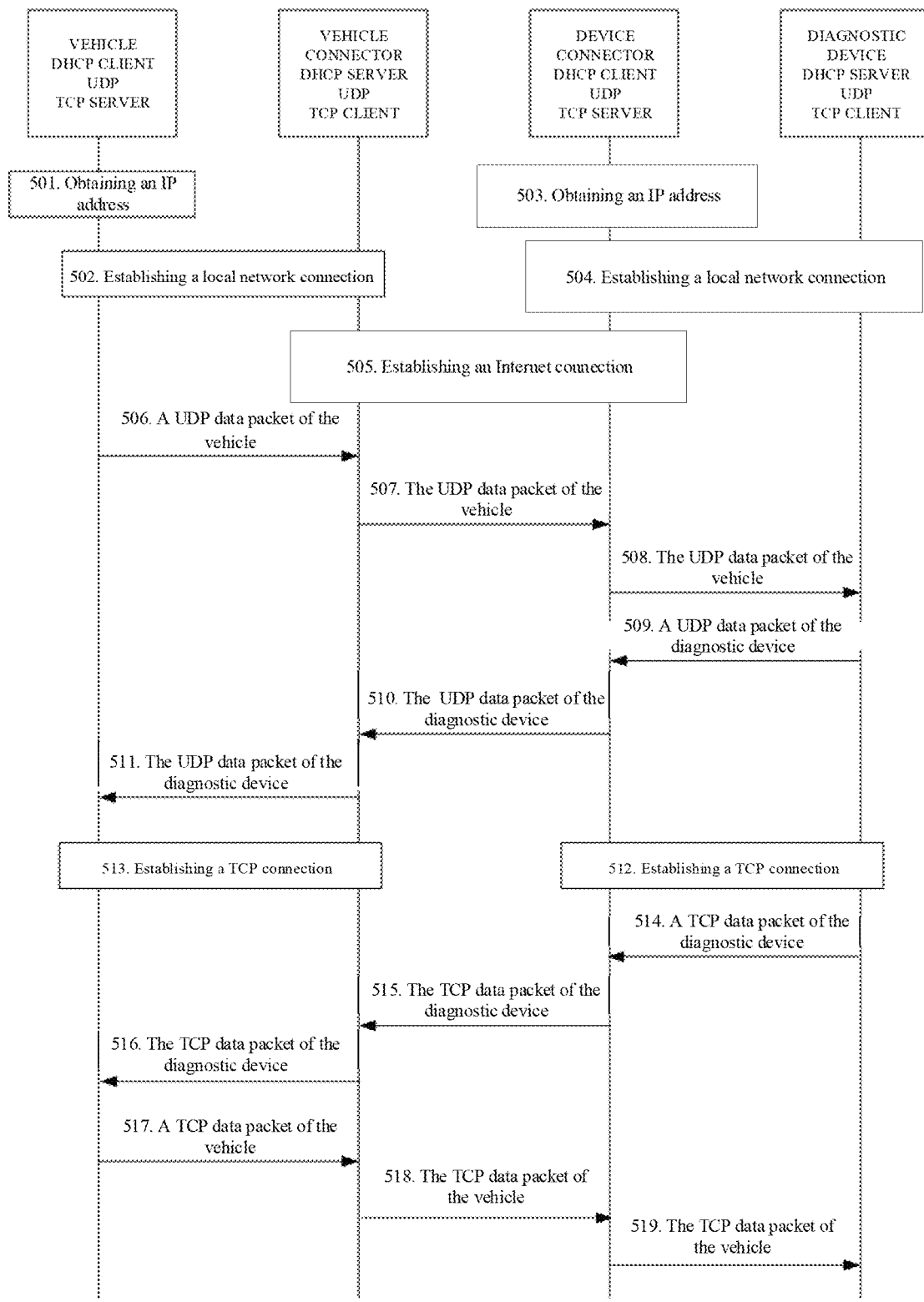
FIG. 5 is a schematic flowchart illustrating a method for remote vehicle diagnostics according to other embodiments of the present disclosure.

FIG. 5 is a schematic flowchart illustrating a method for remote vehicle diagnostics according to other embodiments of the present disclosure. The method is applicable to a remote diagnostic system. The remote diagnostic system includes a vehicle, a vehicle connector, a device connector, and a diagnostic device. The vehicle connector is, for example, a T-BOX, an MVCI, a connector, and the like. The device connector may be an electronic device having a communication function. The diagnostic device may be a variety of vehicle scanning tools, such as a hand-held vehicle scanning tool, a PC-type vehicle scanning tool, and the like. As illustrated in the FIG. 5, a method for remote vehicle diagnostics described in conjunction with another embodiment of the present disclosure may include the following.

At 501, an IP address is assigned to the vehicle.

At 502, a local network connection is established between the vehicle and the vehicle connector.

At 503, an IP address is assigned to the device connector.

At 504, a local network connection is established between the device connector and the diagnostic device.

At 505, an Internet connection is established between the vehicle connector and the device connector.

At 506, the vehicle activates a UDP service and broadcasts a UDP data packet of the vehicle.

At 507, the vehicle connector receives the UDP data packet of the vehicle, and transmits the UDP data packet of the vehicle to the device connector through Internet.

At 508, the device connector receives the UDP data packet of the vehicle transmitted by the vehicle connector and transmits the UDP data packet of the vehicle to the diagnostic device.

At 509, the diagnostic device activates a UDP service and broadcasts a UDP data packet of the diagnostic device.

At 510, the device connector receives the UDP data packet of the diagnostic device, and transmits the UDP data packet of the diagnostic device to the vehicle connector through the Internet.

At 511, the vehicle connector receives the UDP data packet of the diagnostic device transmitted by the device connector and transmits the UDP data packet of the diagnostic device to the vehicle.

At 512, a TCP connection is established between the device connector and the diagnostic device.

At 513, a TCP connection is established between the vehicle connector and the vehicle.

At 514, the device connector receives a TCP data packet of the diagnostic device.

At 515, the device connector transmits the TCP data packet of the diagnostic device to the vehicle connector through the Internet.

At 516, the vehicle connector transmits the TCP data packet of the diagnostic device to the vehicle.

At 517, the vehicle connector receives a TCP data packet of the vehicle.

At 518, the vehicle connector transmits the TCP data packet of the vehicle to the device connector through the Internet.

At 519, the device connector transmits the TCP data packet of the vehicle to the diagnostic device.

Figure 6:
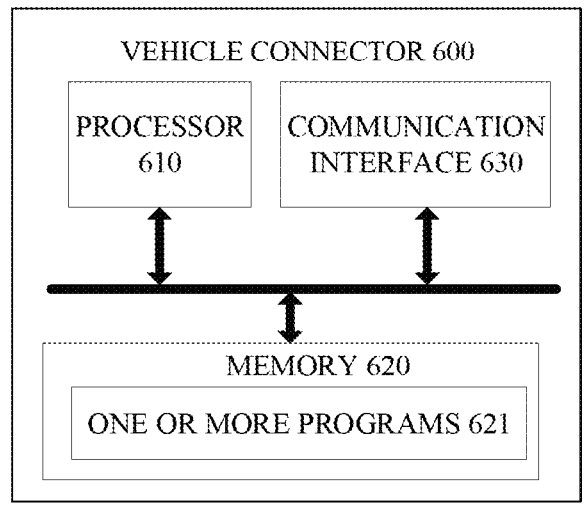
FIG. 6 is a schematic structural diagram illustrating a vehicle connector according to embodiments of the present disclosure.

FIG. 6 is a schematic structural diagram illustrating a vehicle connector 600 according to embodiments of the present disclosure. As illustrated in the FIG. 6, the vehicle connector 600 includes a processor 610, a memory 620, a communication interface 630, and one or more programs 621. The one or more programs 621 are stored in the memory 620 and configured to be executed by the processor 610. The one or more programs 621 include instructions which are configured to execute the following operations. A first data packet transmitted by a device connector is received through remote communication, where the first data packet is obtained by encapsulating a TCP data packet transmitted by a diagnostic device and received by the device connector in a TCP communication manner. The first data packet is converted into a TCP diagnostics instruction data packet and transmits the TCP diagnostics instruction data packet to a vehicle. A TCP diagnostics response data packet returned by the vehicle according to the TCP diagnostics instruction data packet is received based on TCP communication, the TCP diagnostics response data packet is encapsulated into a second data packet, and the second data packet is transmitted to the device connector through the remote communication. At the device connector, the second data packet is converted into the TCP diagnostics response data packet and the TCP diagnostics response data packet is transmitted to the diagnostic device. At the diagnostic device, a diagnostics result is obtained by analyzing and processing the TCP diagnostics response data packet and the diagnostics result is presented to a user.

In some embodiments, the one or more programs further include instructions which are configured to execute the following operations. A network connection with the vehicle is established to assign an IP address to the vehicle.

In some embodiments, the one or more programs further include instructions which are configured to execute the following operations. A UDP service is activated. A UDP data packet broadcasted by the vehicle is received, the UDP data packet broadcasted by the vehicle is encapsulated to a third data packet, and the third data packet is transmitted to the device connector through remote communication. At the device connector, the third data packet is converted into the UDP data packet of the vehicle, the UDP data packet of the vehicle is broadcasted, and a TCP server identical to a TCP server of the vehicle is activated. At the diagnostic device, the UDP data packet of the vehicle is received and a TCP client is created to connect with the TCP server of the device connector. A notification is received from the device connector and a TCP client is created to connect with the TCP server of the vehicle.

In some embodiments, the instructions of the one or more programs configured to establish the network connection with the vehicle to assign the IP address to the vehicle are configured to execute the following operations. A DHCP service (i.e., a DHCP server) is activated to assign the IP address to the vehicle, or the IP address belonging to a same subnet as an IP address of the vehicle is assigned through Auto IP.

In some embodiments, the remote communication is performed through a remote communication connection (e.g., by way of server data forwarding, P2P communication, or mobile communication).

The specific implementation of the vehicle connector provided by the embodiments of the present disclosure will not be detailed herein and reference can be made to the method for remote vehicle diagnostics described in conjunction with the foregoing embodiments.

Figure 7:
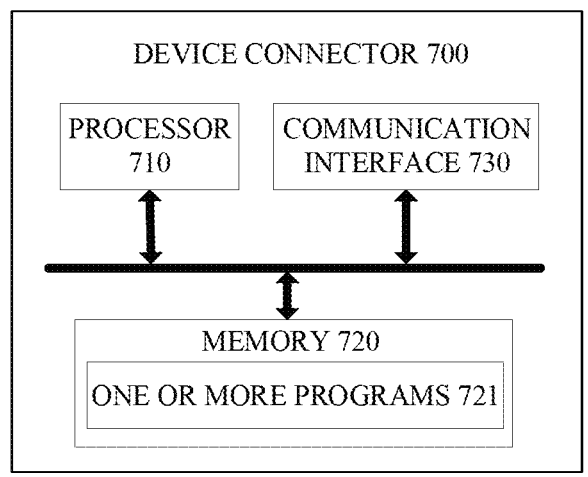
FIG. 7 is a schematic structural diagram illustrating a device connector according to embodiments of the present disclosure.

FIG. 7 is a schematic structural diagram illustrating a device connector 700 according to embodiments of the present disclosure. As illustrated in the FIG. 7, the vehicle connector 700 includes a processor 710, a memory 720, a communication interface 730, and one or more programs 721. The one or more programs 721 are stored in the memory 720 and configured to be executed by the processor 710. The one or more programs 721 include instructions which are configured to execute the following operations. A TCP data packet of a diagnostic device is received in a TCP communication manner, the TCP data packet is encapsulated into a first data packet, and the first data packet is transmitted to a vehicle connector through remote communication. At the vehicle connector, the first data packet received is converted into a TCP diagnostics instruction data packet and the TCP diagnostics instruction data packet is transmitted to a vehicle. At the vehicle connector, a TCP diagnostics response data packet returned by the vehicle according to the TCP diagnostics instruction data packet is received based on TCP communication, and the TCP diagnostics response data packet is encapsulated into a second data packet. The second data packet transmitted by the vehicle connector is received through the remote communication. The second data packet is converted into the TCP diagnostics response data packet and the TCP diagnostics response data packet is transmitted to the diagnostic device. At the diagnostic device, a diagnostics result is obtained by analyzing and processing the TCP diagnostics response data packet and the diagnostics result is presented to a user.

In some embodiments, the one or more programs further include instructions which are configured to execute the following operations. A network connection with the diagnostic device is established to obtain an IP address assigned to the device connector.

In some embodiments, the one or more programs further include instructions which are configured to execute the following operations. A third data packet transmitted by the vehicle connector is received, where the third data packet is obtained by encapsulating a UDP data packet broadcasted by the vehicle and received by the vehicle connector. The third data packet is converted into the UDP data packet of the vehicle, the UDP data packet of the vehicle is broadcasted, and a TCP server identical to a TCP server of the vehicle is activated. At the diagnostic device, the UDP data packet of the vehicle is received and a TCP client is created to connect with the TCP server of the device connector. The vehicle connector is notified to create a TCP client to connect with the TCP server of the vehicle.

In some embodiments, the instructions of the one or more programs configured to establish the network connection with the diagnostic device to obtain the IP address assigned to the device connector are configured to execute the following operations. A DHCP client is activated and the diagnostic device is notified. The IP address assigned by the diagnostic device is received, or the IP address belonging to a same subnet as an IP address of the diagnostic device is obtained through Auto IP.

In some embodiments, a remote communication connection is established in a server data forwarding manner, a P2P communication manner, or a mobile communication manner.

The specific implementation of the device connector provided by the embodiments of the present disclosure will not be detailed herein and reference can be made to the method for remote vehicle diagnostics described in conjunction with the foregoing embodiments.

It is to be noted that, for the sake of simplicity, the foregoing method embodiments are described as a series of action combinations, however, it will be appreciated by those skilled in the art that the present disclosure is not limited by the sequence of actions described. That is because that, according to the present disclosure, certain steps or operations may be performed in other order or simultaneously. Besides, it will be appreciated by those skilled in the art that the embodiments described in the specification are exemplary embodiments and the actions and modules involved are not necessarily essential to the present disclosure. In the foregoing embodiments, the description of each embodiment has its own emphasis. For the parts not described in detail in one embodiment, reference may be made to related descriptions in other embodiments.

From the above, it should be noted that the foregoing embodiments are merely used for illustrating the technical solutions of the present disclosure rather than limiting the present disclosure. While the present disclosure has been described in detail in connection with the foregoing embodiments, it should be understood by those of ordinary skill in the art that modifications may still be made to the technical solutions disclosed in the various foregoing embodiments, or equivalent replacement may be made to a part of technical features thereof, but these modifications or alterations do not make the nature of corresponding technical solutions depart from the scope of the technical solutions of the various embodiments of the present disclosure.

What is claimed is:

1. A method for remote vehicle diagnostics, applicable to a device connector, the method comprising:
   receiving a third data packet transmitted by a vehicle connector, wherein the third data packet is obtained by encapsulating a user datagram protocol (UDP) data packet broadcasted by a vehicle and received by the vehicle connector, the UDP data packet of the vehicle carries an IP address of the vehicle;
   converting the third data packet into the UDP data packet of the vehicle;
   broadcasting the UDP data packet of the vehicle;
   activating a TCP server identical to a TCP server of the vehicle, wherein a diagnostic device receives the UDP data packet of the vehicle and creates a TCP client to connect with the TCP server of the device connector;
   notifying the vehicle connector to create a TCP client to connect with the TCP server of the vehicle;
   receiving a transmission control protocol (TCP) data packet of the diagnostic device in a TCP communication manner, encapsulating the TCP data packet into a first data packet, and transmitting the first data packet to the vehicle connector through remote communication; wherein the vehicle connector converts the first data packet received into a TCP diagnostics instruction data packet and transmits the TCP diagnostics instruction data packet to the vehicle; wherein the vehicle connector receives, based on TCP communication, a TCP diagnostics response data packet returned by the vehicle according to the TCP diagnostics instruction data packet, encapsulates the TCP diagnostics response data packet into a second data packet;
   receiving the second data packet transmitted by the vehicle connector through the remote communication; and
   converting the second data packet into the TCP diagnostics response data packet and transmitting the TCP diagnostics response data packet to the diagnostic device; wherein the diagnostic device obtains a diagnostics result by analyzing and processing the TCP diagnostics response data packet and presents the diagnostics result to a user.

2. The method of claim 1, further comprising:
   before receiving the TCP data packet of the diagnostic device in the TCP communication manner, establishing a network connection with the diagnostic device to obtain an internet protocol (IP) address assigned to the device connector.

3. The method of claim 2, wherein establishing the network connection with the diagnostic device to obtain the IP address assigned to the device connector comprises:
   activating a dynamic host configuration protocol (DHCP) client and notifying the diagnostic device;
   receiving the IP address assigned by the diagnostic device; or
   obtaining the IP address belonging to a same subnet as an IP address of the diagnostic device through Auto IP.

4. The method of claim 1, wherein the remote communication comprises server data forwarding, peer-to-peer (P2P) communication, or mobile communication.

5. A method for remote vehicle diagnostics, applicable to a vehicle connector, the method comprising:
   activating a user datagram protocol (UDP) service, receiving a UDP data packet broadcasted by a vehicle and carrying an IP address of the vehicle, encapsulating the UDP data packet broadcasted by the vehicle into a third data packet, and transmitting the third data packet to a device connector through remote communication; wherein the device connector converts the third data packet into the UDP data packet of the vehicle, broadcasts the UDP data packet of the vehicle, and activates a TCP server identical to a TCP server of the vehicle; wherein a diagnostic device receives the UDP data packet of the vehicle and creates a TCP client to connect with the TCP server of the device connector;
   receiving a notification of the device connector and creating a TCP client to connect with the TCP server of the vehicle;
   receiving a first data packet transmitted by the device connector through the remote communication, the first data packet being obtained by encapsulating a transmission control protocol (TCP) data packet transmitted by the diagnostic device and received by the device connector in a TCP communication manner;
   converting the first data packet into a TCP diagnostics instruction data packet and transmitting the TCP diagnostics instruction data packet to the vehicle; and
   receiving, based on TCP communication, a TCP diagnostics response data packet returned by the vehicle according to the TCP diagnostics instruction data packet, encapsulating the TCP diagnostics response data packet into a second data packet, and transmitting the second data packet to the device connector through the remote communication; wherein the device connector converts the second data packet into the TCP diagnostics response data packet and transmits the TCP diagnostics response data packet to the diagnostic device; wherein the diagnostic device obtains a diagnostics result by analyzing and processing the TCP diagnostics response data packet and presents the diagnostics result to a user.

6. The method of claim 5, further comprising:
before receiving the first data packet transmitted by the device connector through the remote communication, establishing a network connection with the vehicle to assign an internet protocol (IP) address to the vehicle.

7. The method of claim 6, wherein establishing the network connection with the vehicle to assign the IP address to the vehicle comprises:
activating a dynamic host configuration protocol (DHCP) server to assign the IP address to the vehicle; or
assigning the IP address belonging to a same subnet as an IP address of the vehicle through Auto IP.

8. The method of claim 5, wherein the remote communication comprises server data forwarding, peer-to-peer (P2P) communication, or mobile communication.

9. A device connector, comprising a processor, a memory, a communication interface, and one or more programs stored in the memory and configured to be executed by the processor;
the one or more programs comprising instructions configured to:
receive a third data packet transmitted by a vehicle connector, wherein the third data packet is obtained by encapsulating a user datagram protocol (UDP) data packet broadcasted by a vehicle and received by the vehicle connector, the UDP data packet of the vehicle carries an IP address of the vehicle;
convert the third data packet into the UDP data packet of the vehicle;
broadcast the UDP data packet of the vehicle;
activate a TCP server identical to a TCP server of the vehicle, wherein a diagnostic device is configured to receive the UDP data packet of the vehicle and create a TCP client to connect with the TCP server of the device connector;
notify the vehicle connector to create a TCP client to connect with the TCP server of the vehicle;
receive a transmission control protocol (TCP) data packet of the diagnostic device in a TCP communication manner, encapsulate the TCP data packet into a first data packet, and transmit the first data packet to the vehicle connector through remote communication; wherein the vehicle connector is configured to convert the first data packet received into a TCP diagnostics instruction data packet and transmit the TCP diagnostics instruction data packet to the vehicle; wherein the vehicle connector is configured to receive, based on TCP communication, a TCP diagnostics response data packet returned by the vehicle according to the TCP diagnostics instruction data packet, encapsulate the TCP diagnostics response data packet into a second data packet, and transmit the second data packet through the remote communication; and
convert the second data packet received into the TCP diagnostics response data packet and transmit the TCP diagnostics response data packet to the diagnostic device; wherein the diagnostic device is configured to obtain a diagnostics result by analyzing and processing the TCP diagnostics response data packet and present the diagnostics result to a user.

10. The device connector of claim 9, wherein the one or more programs further comprise instructions configured to:
establish a network connection with the diagnostic device to obtain an internet protocol (IP) address assigned to the device connector.

11. The device connector of claim 10, wherein the instructions of the one or more programs configured to establish the network connection with the diagnostic device to obtain the IP address assigned to the device connector are configured to:
activate a dynamic host configuration protocol (DHCP) client and notify the diagnostic device;
receive the IP address assigned by the diagnostic device; or
obtain the IP address belonging to a same subnet as an IP address of the diagnostic device through Auto IP.

12. The device connector of claim 9, wherein the remote communication comprises server data forwarding, peer-to-peer (P2P) communication, or mobile communication.

13. The device connector of claim 9, wherein the device connector is configured to obtain configuration of DoIP communication pins of the vehicle detected by the vehicle connector, and the device connector is configured with DoIP communication pins according to the configuration of the DoIP communication pins of the vehicle.

14. A vehicle connector, comprising a processor, a memory, a communication interface, and one or more programs stored in the memory and configured to be executed by the processor;
the one or more programs comprising instructions configured to:
activate a user datagram protocol (UDP) service, and receive a UDP data packet broadcasted by a vehicle and carrying an IP address of the vehicle, encapsulate the UDP data packet broadcasted by the vehicle into a third data packet, and transmit the third data packet to a device connector through the remote communication; wherein the device connector is configured to convert the third data packet into the UDP data packet of the vehicle, broadcast the UDP data packet of the vehicle, and activate a TCP server identical to a TCP server of the vehicle; wherein a diagnostic device is configured to receive the UDP data packet of the vehicle and create a TCP client to connect with the TCP server of the device connector;
receive a notification of the device connector and create a TCP client to connect with the TCP server of the vehicle;
receive a first data packet transmitted by the device connector through the remote communication, the first data packet being obtained by encapsulating a transmission control protocol (TCP) data packet transmitted by the diagnostic device and received by the device connector in a TCP communication manner;
convert the first data packet into a TCP diagnostics instruction data packet and transmit the TCP diagnostics instruction data packet to the vehicle; and
receive, based on TCP communication, a TCP diagnostics response data packet returned by the vehicle according to the TCP diagnostics instruction data packet, encapsulate the TCP diagnostics response data packet into a second data packet, and transmit the second data packet to the device connector through the remote communication; wherein the device connector is configured to convert the second data packet into the TCP diagnostics response data packet and transmit the TCP diagnostics response data packet to the diagnostic device; wherein the diagnostic device is configured to obtain a diagnostics result by analyzing and processing the TCP diagnostics response data packet and present the diagnostics result to a user.

15. The vehicle connector of claim 14, wherein the one or more programs further comprise instructions configured to:
   establish a network connection with the vehicle to assign an internet protocol (IP) address to the vehicle.

16. The vehicle connector of claim 14, wherein the remote communication comprises server data forwarding, peer-to-peer (P2P) communication, or mobile communication.

* * * * *